J. B. WOOD.
PAVEMENT.
No. 176,726.  Patented April 25, 1876.
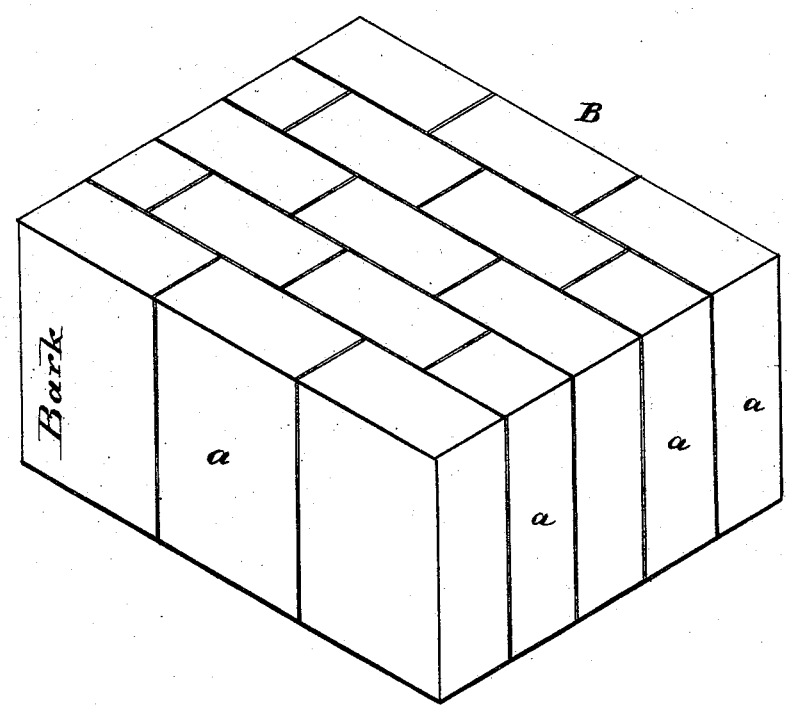
Witnesses
Geo. H. Strong.
John L. Binns
Inventor
John B. Wood
by Dewey & Co
Attys

UNITED STATES PATENT OFFICE.

JOHN B. WOOD, OF SANTA ROSA, CALIFORNIA.

IMPROVEMENT IN PAVEMENTS.

Specification forming part of Letters Patent No. 176,726, dated April 25, 1876; application filed February 10, 1876.

*To all whom it may concern:*

Be it known that I, JOHN B. WOOD, of Santa Rosa, Sonoma county, State of California, have invented an Improved Pavement; and I do hereby declare the following description and accompanying drawings are sufficient to enable any person skilled in the art or science to which it most nearly appertains to make and use my said invention or improvement without further invention or experiment.

My invention relates to an improved pavement or floorway for streets, courts, stables, alley-ways, and other places where it may be desired to construct a foot or road way.

My improvement consists in the employment of the bark of trees as a material for constructing such walks, pavements, or street-covering. For this purpose I can use the bark of any species of large trees which produce a bark or epidermis of sufficient thickness; but I prefer to use the bark of the California redwood, (*Sequoia*,) or fir, (*Abies*,) as the bark of these trees grows to a considerable thickness, and while it is quite durable, it possesses elastic qualities, which especially adapt it for pavements.

The bark can be placed in lengths upon a roadway, so as to form an excellent and durable pavement; but I prefer to cut it into short lengths, *a a*, and place these lengths vertically side by side, so as to present the end of the grain of the bark for a wearing-surface until I form them into blocks, B, of convenient size to handle and place upon the roadway.

Any suitable adherent, such as asphaltum or cement, can be used for uniting the lengths together in forming them into pavement-blocks, or nails could be used, if preferred or found cheaper.

When alphaltum is used the pieces between which the asphaltum is placed should be pressed together to make them adhere more firmly.

A pavement thus constructed would be very durable and present a soft elastic wearing-surface.

The durability of the barks above mentioned is understood by only a few persons; but I have seen pieces of it lying upon roadways where a continual travel passed over it for months without destroying it, and this was when the bark was lying lengthwise upon the ground, without the advantage of being set on end, so as to present the end of its grain for wear.

Having thus described my invention, what I claim, and desire to secure by Letters Patent, is—

Pavement - blocks B, constructed of short lengths of the bark of trees, placed vertically side by side and cemented together, so as to present the end of the grain of the bark for wear, substantially as and for the purpose described.

JOHN B. WOOD.

Witnesses:
JNO. T. FORTSON,
GEO. P. NOONAN.